G. SIFFERT & G. W. STEELE.
PERAMBULATOR OR VEHICLE.
APPLICATION FILED MAR. 28, 1908.
918,782.
Patented Apr. 20, 1909.
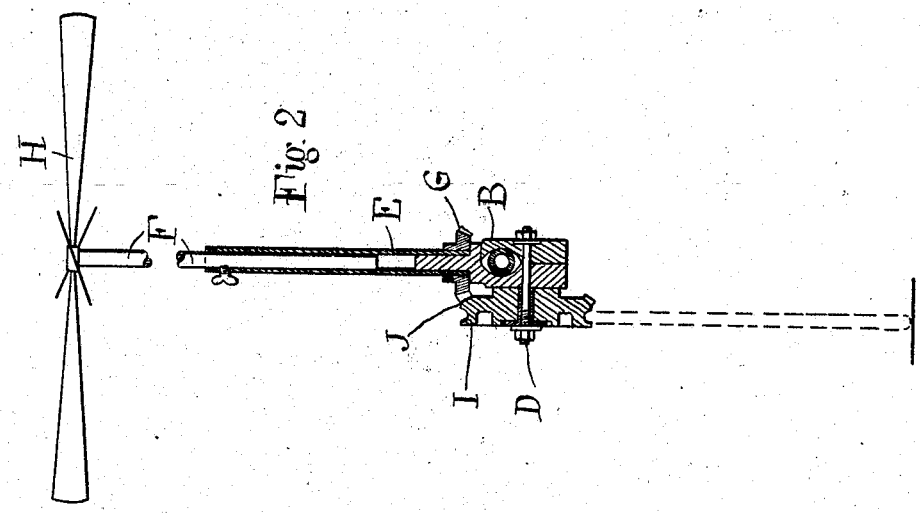
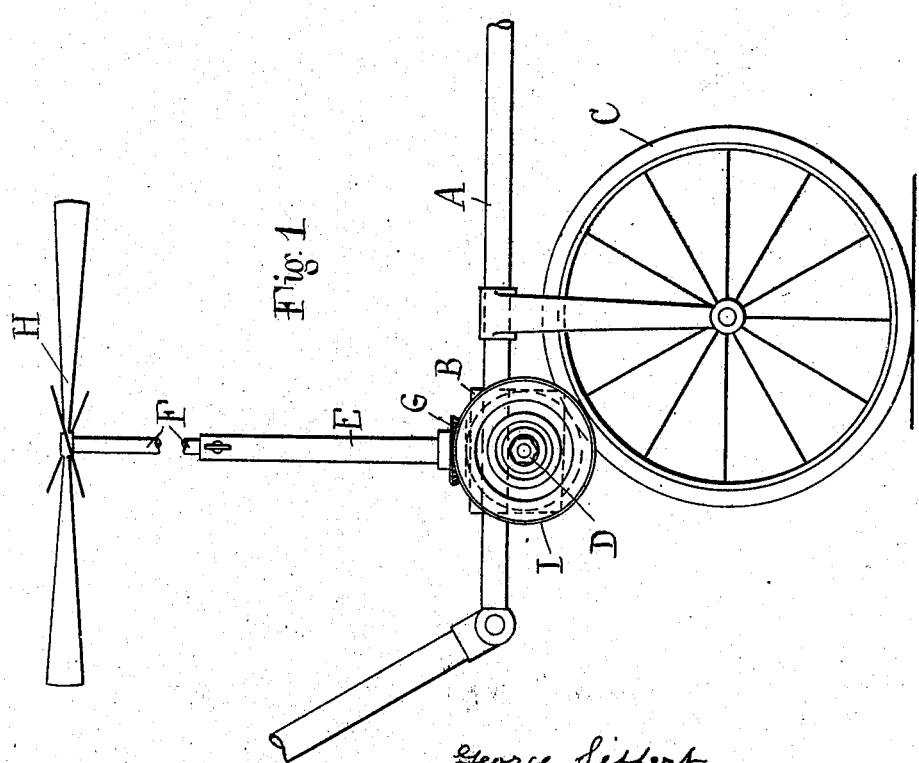

UNITED STATES PATENT OFFICE.

GEORGE SIFFERT AND GEORGE WASHINGTON STEELE, OF BROOKLYN, NEW YORK.

PERAMBULATOR OR VEHICLE.

No. 918,782.  Specification of Letters Patent.  Patented April 20, 1909.

Application filed March 28, 1908. Serial No. 423,881.

*To all whom it may concern:*

Be it known that we, GEORGE SIFFERT and GEORGE WASHINGTON STEELE, citizens of the United States, residing at Brooklyn, in the county of Kings and State of New York, have invented certain new and useful Improvements in Perambulators or Vehicles, of which the following is a specification, reference being had therein to the accompanying drawing.

Our invention relates to improvements in perambulators or vehicles, more particularly it has reference to an attachment adapted to be applied at will to a vehicle such as a baby carriage.

Referring to the accompanying drawings Figure 1 is a view of part of the vehicle showing an application of our invention, and Fig. 2 is a cross section of the same.

A is the frame work of the vehicle, B the frame work of the attachment, and C the vehicle wheel.

D is a bolt adapted to bind the frame work B to the frame work A of the vehicle and provide a bearing for the driving wheel of the apparatus, and E is a tube extending upwardly from the frame work adapted to receive the spindle F and carrying a beveled gear G at the lower extremity. At the upper extremity of the spindle may be mounted any suitable form of fan such as H.

I is a specially constructed friction bearing or driving wheel provided with a circumferential groove around the periphery adapted to contact with the tire of the wheel C from which it receives its power. On one side of this friction wheel is mounted the beveled gear J adapted to intercalate with the beveled gear G thereby communicating the power to the fan H through the spindle F.

A wheel I is mounted upon the frame work B by the bolt D.

The attachment may be adjusted longitudinally and tilted forward or backward by means of the bolt D. This is made possible by the elongated opening between the framework B which is preferably elliptical.

Various modifications may be made without departing from the spirit of the invention.

Having described the invention what we claim as new and desire to secure by Letters Patent is:

In a vehicle, an attachment mounted thereupon, said attachment provided with a driving wheel having a periphery contacting with and driven by the wheel of said vehicle, binding means for securing said attachment to said vehicle, said binding means providing bearing for said driving wheel and for a pinion intercalating therewith and driven thereby, said pinion provided with bearing for a shaft carrying a fan and said shaft vertically adjustable in said bearing.

In testimony whereof we affix our signatures in presence of two witnesses.

GEORGE SIFFERT.
GEORGE WASHINGTON STEELE.

Witnesses:
JAMES M. GORMAN,
FREDERIC A. BEHRENS.